United States Patent
Mircea et al.

(10) Patent No.: US 8,837,065 B1
(45) Date of Patent: Sep. 16, 2014

(54) SYSTEMS AND METHODS FOR FAST MEASUREMENT OF CHANNEL PERFORMANCE METRICS SUCH AS ERROR MARGIN AND OFF-TRACK RECORDING CAPABILITY IN SHINGLED MAGNETIC RECORDING

(71) Applicant: WD Media, LLC, San Jose, CA (US)

(72) Inventors: Dragos I. Mircea, San Jose, CA (US); Andreas Moser, San Jose, CA (US); Harold H. Gee, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/133,324

(22) Filed: Dec. 18, 2013

Related U.S. Application Data

(60) Provisional application No. 61/863,980, filed on Aug. 9, 2013.

(51) Int. Cl.
  *G11B 27/36* (2006.01)
  *G11B 5/09* (2006.01)
  *G11B 20/18* (2006.01)

(52) U.S. Cl.
  CPC ..................... *G11B 20/18* (2013.01)
  USPC .................. 360/31; 360/39; 360/55; 360/75

(58) Field of Classification Search
  None
  See application file for complete search history.

(56) References Cited

U.S. PATENT DOCUMENTS

| | | | |
|---|---|---|---|
| 6,445,521 B1 | 9/2002 | Schaff et al. | |
| 6,680,609 B1 | 1/2004 | Fang et al. | |
| 6,788,489 B1 | 9/2004 | Chang et al. | |
| 7,027,255 B2 | 4/2006 | Schmidt | |
| 7,529,050 B2 | 5/2009 | Shen et al. | |
| 8,587,889 B2 * | 11/2013 | Kawabe | 360/60 |
| 8,638,522 B2 * | 1/2014 | Matsuo et al. | 360/77.02 |
| 8,699,162 B1 * | 4/2014 | Grobis et al. | 360/48 |
| 2004/0010391 A1 | 1/2004 | Cheng-I Fang et al. | |
| 2009/0034380 A1 | 2/2009 | Ngwe et al. | |
| 2013/0194689 A1 * | 8/2013 | Takai | 360/31 |

* cited by examiner

*Primary Examiner* — Muhammad N Edun

(57) ABSTRACT

Systems and methods for making fast measurements of channel performance metrics such as error margin and off-track recording capability in shingled magnetic recording are provided. One such method involves writing a plurality of shingled tracks on the disk, measuring an off track read capability (OTRC) of each of the plurality of shingled tracks, determining radial endpoints of the measured OTRC for each of the plurality of shingled tracks, determining an approximate radial center for each of the plurality of shingled tracks based on the respective OTRC radial endpoints, and measuring a channel performance metric at a range centered around the approximate radial center for each of the plurality of shingled tracks. In one such case, the channel performance metric involves error margin. One such system includes a processor coupled to a memory, a magnetic transducer, and a test platform, where the processor is configured to perform the method.

20 Claims, 6 Drawing Sheets

SYSTEMS AND METHODS FOR FAST MEASUREMENT OF CHANNEL PERFORMANCE METRICS SUCH AS ERROR MARGIN AND OFF-TRACK RECORDING CAPABILITY IN SHINGLED MAGNETIC RECORDING

CROSS-REFERENCE TO RELATED APPLICATION(S)

This application claims priority to and the benefit of U.S. Provisional Application No. 61/863,980 filed on Aug. 9, 2013, and entitled, "SYSTEMS AND METHODS FOR FAST MEASUREMENT OF ERROR MARGIN AND OFF-TRACK RECORDING CAPABILITY IN SHINGLED MAGNETIC RECORDING", the entire content of which is incorporated herein by reference.

FIELD

The present invention relates generally to shingled magnetic recording, and more specifically to systems and methods for making fast measurements of channel performance metrics such as error margin and off-track recording capability in shingled magnetic recording.

BACKGROUND

Shingled magnetic recording (SMR) is a new paradigm in magnetic recording which has the potential to push hard disk drive (HDD) storage capacities above current levels. The most enticing feature of SMR is that it does not require revolutionary developments in media and head design/fabrication like other magnetic storage alternatives such as heat assisted magnetic recording (HAMR) or bit-patterned media. In principle, the existing perpendicular magnetic recording (PMR) heads and media can be used in SMR and provide two digit percentage increases (10 to 20 percent) of areal density capability.

For the purpose of developing new heads/media and assessing their SMR performance, testing on commercial spin stands needs to account for the sequential nature of shingled track writing. In PMR tests which involve off-track writing (for example, squeeze, signal to noise ratio (SNR), error margin (EM), and the like) the track of interest generally does not shift radially with respect to its original location because the off-track writing is done on both sides of the central track and at equal radial distances with respect to the track center. In contrast, in SMR, the off-track writing occurs only on one side of each track, which causes the resulting shingled tracks to change their radial location. This change in radial location creates challenges for measuring certain metrics of performance for magnetic media.

DETAILED DESCRIPTION

Two key metrics of head/media performance in a hard disk drive (HDD) include the error rate (ER) or error margin (EM) for low density parity check (LDPC) channels/codes and off track recording capability (OTRC). In perpendicular magnetic recording (PMR), these two key metrics are measured when the track of interest is isolated (on-track ER/EM and on-track OTRC) and when the track of interest is affected by subsequent side writing, such as when additional tracks (aggressor tracks) are written on both sides of the track of interest. For both cases (isolated tracks and those subjected to side writing) EM is measured and reported at the radial location of the original track.

Writing the aggressor tracks symmetrically on both sides of the original track results in lower EM and OTRC as compared to the case of an isolated track. One intrinsic feature of writing aggressor tracks on both sides of the central track is that the EM and OTRC bathtubs (approximate shapes of EM and OTRC curves as functions of radial position) do not shift radially after writing the aggressors. Thus, measuring EM after the aggressor writes requires no special radial positioning of the reader.

However, in shingled magnetic recording (SMR), the role of the aggressor tracks is played by the neighboring track which is written on one side only. Because the shingled tracks are partially overwritten on only one side, their centers move in the radial direction from their intended location. Thus, EM measurement of the shingled tracks requires a priori knowledge of the new radial position of the shingled tracks (the maximum of the EM bathtubs).

In a related art SMR EM measurement, several tracks are written sequentially at equally spaced radial offsets (for example from negative to positive radial offsets or vice versa, depending on the radius and the skew angle) with pseudo-random binary sequences (PRBS), and then an EM bathtub measurement is performed. A hypothetical experiment can be helpful in understanding the challenges associated with this measurement.

Figure 7:
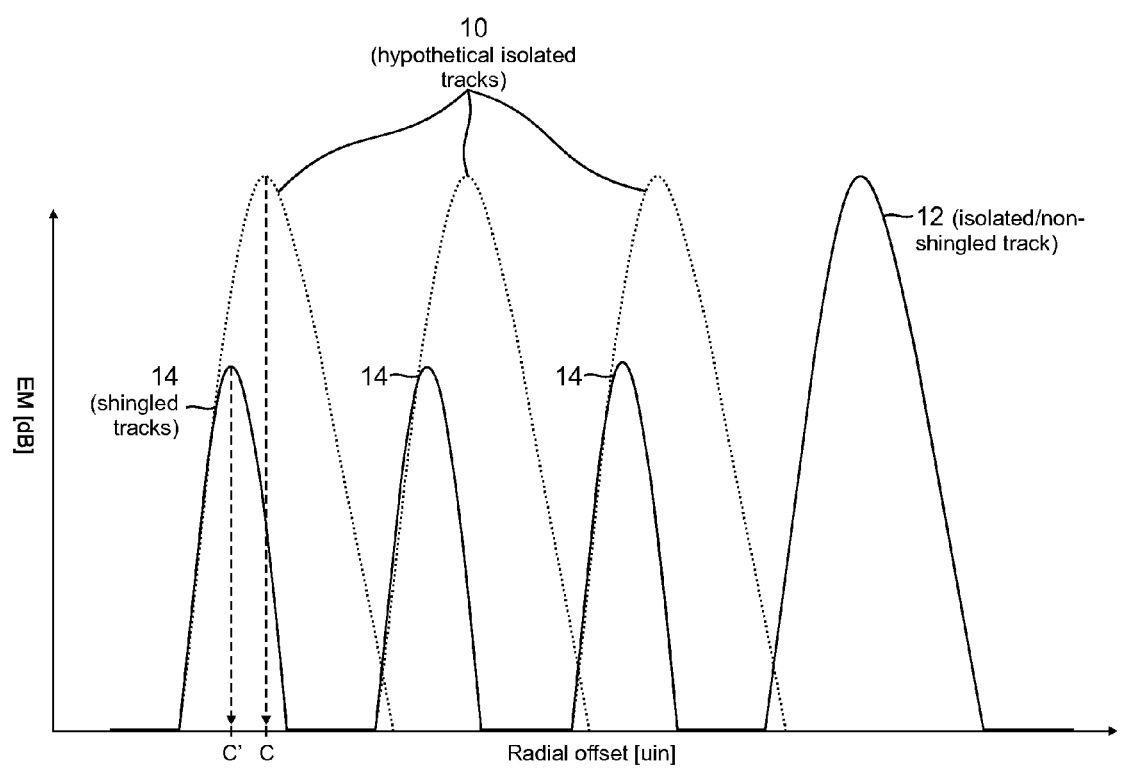
FIG. 7 is a schematic graph of error margin (EM) versus radial offset showing EM measurements for both hypothetical isolated tracks and actual shingled tracks to highlight a problem of interest in accordance with one embodiment of the invention.

FIG. 7 is a schematic graph of error margin (EM in decibels or dB) versus radial offset (in micro inches or uin) showing EM measurements for both hypothetical isolated tracks 10 and actual shingled tracks 14 to highlight a problem of interest in accordance with one embodiment of the invention. Assume for this hypothetical experiment that the shingled tracks are written from negative to positive radial offsets (e.g., from the left side to the right side). In this hypothetical experiment, also assume for the moment that the shingled tracks do not interact with each other during both the write and read operations, and thus they look like a series of isolated tracks 10 which have been "compressed" in the radial direction. The EM versus radial offset measurement (EM bathtub) would result in the series of tracks 10 represented by the dotted lines 10 in FIG. 7. Note that the peak center for each of these tracks 10 is located at the radial offset C where the head executed the write operation. That is, at the intended location. Note also that the right-most track 12 of the series has not been shingled since it is the last track. This last track 12 is not shingled and thus its EM bathtub is similar to that of an isolated track. Isolated/non-shingled track 12 is shown primarily for reference.

In reality, each track that is written on the right side (at positive radial offset) degrades the previously written track to its left. This degradation manifests itself as a reduction of the EM associated with the left track and a shift of the left track's center toward the left side. The degraded shingled tracks 14 are represented by solid lines in FIG. 7. Note how the original track center C has shifted to C'.

The ideal SMR EM measurement aims at finding the maximum of the EM for each track. Additionally, the widths of the bathtubs at a predefined noise boost level (for example, about 0.4 dB) can represent the shingled OTRC (ShOTRC). The reported SMR EM is the average of the full EM maxima of all SMR tracks, excluding the isolated/non-shingled track.

The straightforward approach to resolving the radial shift experienced by the shingled tracks is to measure the EM bathtubs (EM vs. radial offset measurements like those shown in FIG. 7) and find the maximum value of EM for each of the shingled tracks (e.g., using a traditional or full scan algorithm approach). However, with low density parity check (LDPC) channels which report error margin, such an approach can be extremely time consuming, and thus impractical for quick assessments of head/media performance in shingled recording.

As to the specific details of the EM measurements, it is noted that the LDPC channels do not report error rate (ER) but report the noise power level (e.g., EM) that when injected into the channel causes the channel to fail a certain ER criterion or a sector failure rate (SFR). The EM bathtub measurement involves positioning the reader at each desired radial offset and gradually increasing the noise power until the channel fails the ER (or SFR) criterion. The amount of noise power that triggers the channel failure can be defined as the EM. For this reason, the EM bathtub measurement is time consuming, and thus is impractical for routine media/head testing. Traditionally, the off track recording capability (OTRC) is defined as the width of the ER bathtub where ER crosses a certain well-defined threshold. For the LDPC channels, OTRC is defined similarly but the threshold is in units of noise boost. For example, a widely used threshold is about 0.4 dB. A faster technique for measuring OTRC with LDPC channels is to set the noise boost to about 0.4 dB, move the reader in the radial direction, and then record whether the channel passes or fails the ER (or SFR) criterion. The result is a list of radial offsets with corresponding "pass" or "fail" flags. This OTRC measurement is much faster than EM because it eliminates the time consuming step of increasing the noise boost until the channel fails.

In one aspect, the systems and methods described herein can involve a method of measuring the EM of several shingled tracks where the time consuming EM bathtub measurements are effectively replaced by fast OTRC bathtub measurements. The results of the OTRC bathtub measurements include the radial positions and widths of the magnetic tracks after shingling. After the centers of the shingled tracks are identified from the OTRC bathtubs, the reader is positioned at the track centers and only a single EM measurement is needed to characterize the performance of the head/media combination.

Referring now to the drawings, embodiments of systems and methods for making fast measurements of channel performance metrics such as error margin (EM) and off-track recording capability (OTRC) for shingled magnetic recording are illustrated. One such system includes a test platform configured to receive, support, and rotate a disk configured for magnetic information storage, a magnetic transducer configured to write to, and read from, the disk, a memory, a processor coupled to the memory, the magnetic transducer, and the test platform, where the processor is configured to write a plurality of shingled tracks on the disk, measure an off track read capability (OTRC) of each of the plurality of shingled tracks, determine radial endpoints of the measured OTRC for each of the plurality of shingled tracks, determine an approximate radial center for each of the plurality of shingled tracks based on the respective OTRC radial endpoints, and measure a channel performance metric at a range centered around each of the approximate radial center for each of the plurality of shingled tracks. One exemplary method involves performing the actions described above with respect to the processor with a test system. In several embodiments, the channel performance metric involves error margin.

Figure 1:
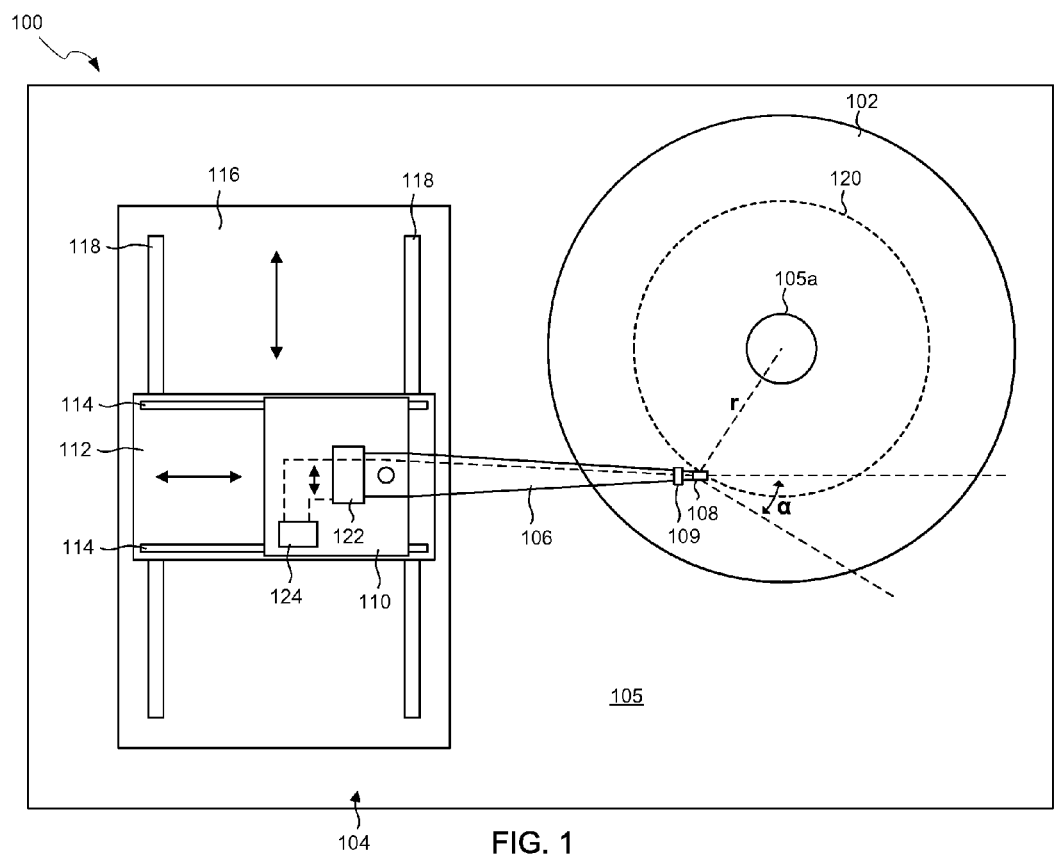
FIG. 1 is a top schematic view of a spin stand testing system configured to make fast measurements of channel performance metrics such as error margin (EM) and off-track recording capability (OTRC) for shingled magnetic recording in accordance with one embodiment of the invention.

FIG. 1 is a top schematic view of a spin stand testing system 100 configured to make fast measurements of channel performance metrics such as error margin (EM) and off-track recording capability (OTRC) for shingled magnetic recording in accordance with one embodiment of the invention. The spin stand testing system 100 includes a disk 102 and a positioning device 104 on a test platform 105 for receiving, supporting, and rotating the disk 102. The test platform 105 includes a spindle 105*a* that is configured to receive the disk 102 and rotate the disk 102 around its center axis at a variable rotation rate. The disk 102 is representative of a magnetic recording disk that would be used in a hard disk drive and is configured to be rotated around the spindle 105*a* at the variable rotation rate. The positioning device 104 secures a head gimbal assembly (HGA) 106 that includes a head 108 (e.g., magnetic transducer). The HGA 106 also includes a micro-actuator 109 that is configured to laterally translate a read sensor of the head 108, for instance, by translating the entire head 108 as shown, or by translating just a transducer of the head 108 that includes the read sensor.

The positioning device 104 is configured to position the head 108 to a desired location on the disk 102, for example, with a combination of coarse and fine positioners for translating the HGA 106 to a track 120. As shown in FIG. 1, the positioning device 104 includes both coarse and fine positioners. The coarse positioning of the head 108 is performed by two platforms on orthogonal rail systems, while the fine positioning is performed by a secondary mover 122.

Turning first to the coarse positioners, the HGA 106 is secured to a base 110 on a first platform 112. The first platform 112 includes a set of rails 114 upon which the base 110 can move back and forth in a first direction relative to the first platform 112. A motor (not shown) is one example of a mechanism for driving the base 110 relative to the first platform 112. Similarly, the positioning device 104 also has a second platform 116 including a set of rails 118. In this embodiment the first platform 112 is configured to move upon the rails 118 relative to the second platform 116 in a second direction.

By moving the base 110 relative to the first platform 112, and by moving the first platform 112 relative to the second platform 116, the head 108 can be positioned at a desired disk radius, r, and skew angle, α (an angle formed between a longitudinal axis of the HGA 106 and a tangent to a radial line through the head 108). It will be appreciated, however, that various types of coarse positioning means, and not just that employed by the positioning device 104 to move the base 110 relative to the disk 102, may be used in accordance with embodiments of the invention.

In addition to the orthogonal rail system for coarse positioning, the positioning device 104 also includes the secondary mover 122. The secondary mover 122 provides a finer positioning capability in a lateral direction than is provided by the orthogonal rail system. The secondary mover 122 provides fine positioning, for example, through the use of an actuator based on a piezoelectric material. Preferably, the secondary mover 122 is able to move the head 108 in steps that are on the order of a micro-inch or less.

The positioning device 104 further includes a processor 124 that may be electrically coupled to one or more of the head 108, the microactuator 109, the secondary mover 122, the coarse and fine positioners, and the spindle 105a. The processor 124 can include a memory configured to store information such as instructions to be executed on the processor 124 or other information. In some embodiments, the memory is integrated with processor 124. In other embodiments, the memory is not integrated with processor 124. The processor 124 is configured to execute instructions for operating the spin stand testing system 100.

In this context, the processor 124 refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information.

In several embodiments, the processor 124 is coupled to a memory (integrated or non-integrated), a magnetic transducer in the head 108, and the test platform 105 to control various aspects of test operation. For example, in a number of embodiments, the processor can be configured to write a plurality of shingled tracks on the disk, measure an off track read capability (OTRC) of each of the plurality of shingled tracks, determine radial endpoints of the measured OTRC for each of the plurality of shingled tracks, determine an approximate radial center for each of the plurality of shingled tracks based on the respective OTRC radial endpoints, measure a channel performance metric at a range centered around each of the approximate radial center for each of the plurality of shingled tracks. In one such embodiment, the range consists of a single point such that the processor is configured to measure the channel performance metric at the approximate radial center for each of the plurality of shingled tracks.

In several embodiments, the radial endpoints of the OTRC each represent a point at which a measurement of the channel performance metric exceeds a preselected level. In one embodiment, the channel performance metric is error margin, and the preselected level is a preselected noise boost level and is about 0.4 decibels. In several embodiments, the processor is further configured to determine a maximum value of the measured channel performance metric within the range for each of the plurality of shingled tracks. In one embodiment, the processor is further configured to determine the approximate radial centers for each of the plurality of shingled tracks based on the respective OTRC radial endpoints by determining a radial midpoint between the radial endpoints for each of the plurality of shingled tracks. Each of these features will be discussed in further detail below with particular reference to the graph of error margin versus radial offset showing EM measurements for three shingled tracks depicted in FIG. 3.

In several embodiments, the measurements of the channel performance metric are used to modify a process for manufacturing a component (e.g., disk, head, or other such component) for shingled magnetic recording. In some embodiments, the channel performance metric measurements (e.g., the EM measurements) can be used to modify a process for operating a hard disk drive configured for shingled magnetic recording.

In several embodiments, the processor is further configured to calculate a representative value of the channel performance metric for all of the plurality of shingled tracks, where the representative value can be a mean, a median, and/or a standard deviation. In some embodiments, the channel performance metric includes a metric such as an error margin, an error rate, a Viterbi metric margin, a channel quality metric, and/or combinations thereof.

Figure 2:
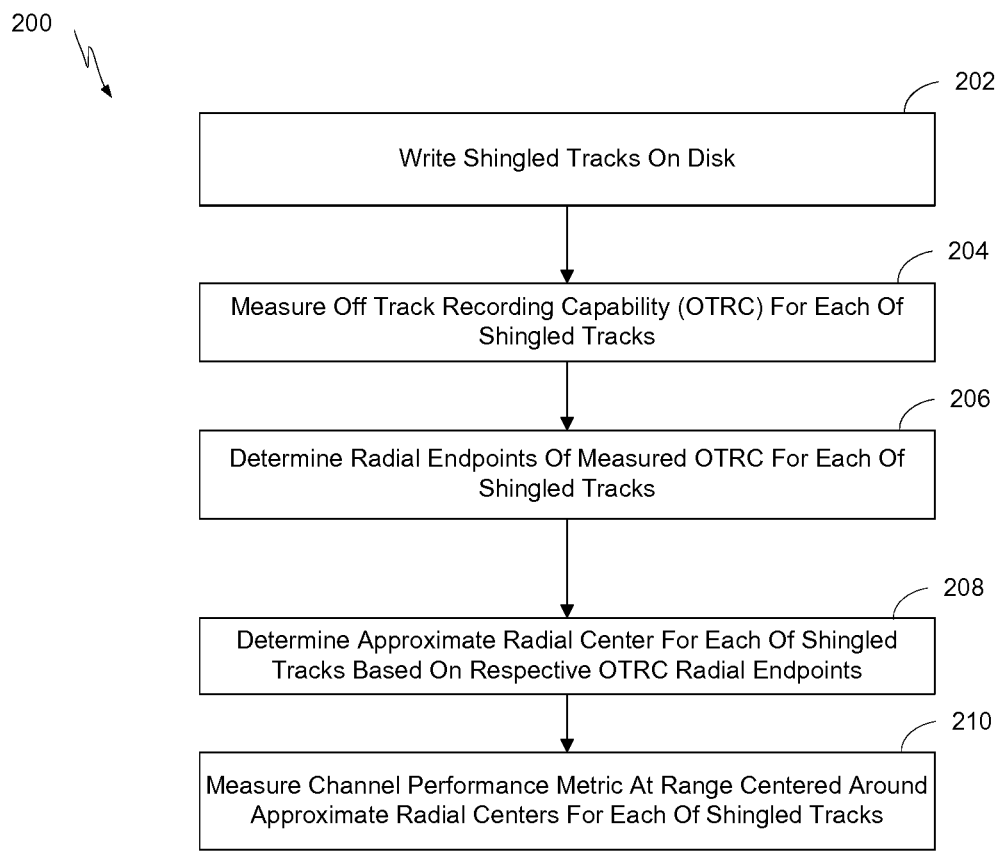
FIG. 2 is a flowchart of a process for making fast measurements of channel performance metrics such as error margin (EM) and off-track recording capability (OTRC) for shingled magnetic recording in accordance with one embodiment of the invention.

FIG. 2 is a flowchart of a process 200 for making fast measurements of channel performance metrics such as error margin (EM) and off-track recording capability (OTRC) for shingled magnetic recording in accordance with one embodiment of the invention. In particular embodiments, the process 200 can be performed using the spin stand testing system 100 of FIG. 1. The process can start at block 202. In block 202, the process writes a number of shingled tracks on a test disk. In block 204, the process measures an off track read capability (OTRC) of each of the shingled tracks written to the disk. In block 206, the process determines radial endpoints of the measured OTRC for each of the shingled tracks written to the disk. In block 208, the process determines an approximate radial center for each of the shingled tracks written to the disk based on the respective OTRC radial endpoints. In block 210, the process measures a channel performance metric at a range centered around each of the approximate radial center for each of the shingled tracks. In several embodiments, the range consists of a single point such that the process measures the channel performance metric at the approximate radial center for each of the shingled tracks.

In several embodiments, the radial endpoints of the OTRC each represent a point at which a measurement of the channel performance metric exceeds a preselected level. In one embodiment, the channel performance metric is error margin, and the preselected level is a preselected noise boost level and is about 0.4 decibels.

In several embodiments, the process determines a maximum value of the measured channel performance metric within the range for each of the shingled tracks written. In one embodiment, the process determines the approximate radial centers for each of the shingled tracks written based on the respective OTRC radial endpoints by determining a radial midpoint between the radial endpoints for each of the plurality of shingled tracks.

Each of these features will be discussed in further detail below with particular reference to the graph of error margin versus radial offset showing EM measurements for three shingled tracks depicted in FIG. 3.

In several embodiments, the measurements of the channel performance metric are used to modify a process for manufacturing a component (e.g., disk, head, or other such component) for shingled magnetic recording. In some embodiments, the channel performance metric measurements (e.g., the EM measurements) can be used to modify a process for operating a hard disk drive configured for shingled magnetic recording.

In several embodiments, the process also calculates a representative value of the channel performance metric for all of the plurality of shingled tracks, where the representative value can be a mean, a median, and/or a standard deviation. In some embodiments, the channel performance metric includes a metric such as an error margin, an error rate, a Viterbi metric margin, a channel quality metric, and/or combinations thereof.

In one embodiment, the process can perform the sequence of actions in a different order. In another embodiment, the process can skip one or more of the actions. In other embodiments, one or more of the actions are performed simultaneously. In some embodiments, additional actions can be performed.

In some embodiments, the process 200 can performed in a more detailed manner (e.g., applying more specifically to error margin). For example, in block 202, the process can write a desired number of tracks to a test disk. In blocks 204 and 206, the process runs an OTRC bathtub measurement at a pre-defined noise boost level. This measurement provides a list of radial offsets where EM exceeds the noise boost value (e.g., the radial locations which are "covered" by the shingled tracks). At the end of block 206 for this example, the process has a set of radial positions which each indicate where shingled track number k starts, $x1_k$, and where it ends, $x2_k$ ($x1_k < x2_k$), where $x1_k$ and $x2_k$ effectively represent radial endpoints of the shingled track. The OTRC of the shingled tracks can be calculated as $OTRC_k = \|x1_k - x2_k\|/2$ (e.g., effectively half of the width of the bathtub curve).

In block 208, the process uses the radial endpoints ($x1_k$ and $x2_k$, where k=1 to total number of tracks-1, and the last track is ignored) to estimate the centers of the shingled tracks. The simplest approach is to assume that despite writing the tracks sequentially only on one side, the maximum of the EM bathtub for track number k is located at the midpoint between $x1_k$ and $x2_k$, e.g., $c_k = (x1_k + x2_k)/2$, where, for example, SMR writing shifts the EM bathtub and lowers its peak value.

In block 210, the process positions the reader at the midpoint locations ($c_k$) and runs the EM measurement. The result is an array $EM_k$ with k equal to 1 to total number of shingled tracks-1. The process can then report the mean values of $EM_k$, $OTRC_k$ and $c_k$. These three metrics characterize the shingled performance of the head/disk combination at the testing conditions kfci (kilo flux changes per inch) and ktpi (kilo tracks per inch). In some embodiments, the results of the algorithms/processes can include three arrays $EM_k$, $OTRC_k$ and $c_k$, representing the error margin, OTRC and track centers for the series of shingled tracks and their average values which characterize the SMR performance of the head/disks that were tested.

A series of measurements were performed where the results from the traditional approach of measuring the full EM bathtubs were compared with the algorithms proposed here. For acceptable kfci/ktpi testing conditions, the approximated centers ($c_k$) produced by the proposed algorithms approximate well the location of the respective EM maximums. For the case of aggressive kfci/ktpi values, the shingled EM bathtubs could become asymmetric ("tilted" toward the left side in FIG. 7) and the EM measurements might then exhibit poor repeatability independent of the employed algorithm.

In some embodiments, the accurate and slightly more time consuming approach can be used in making a fast measurement of a channel performance metric such as error margin. For example, during block 210, the reader is positioned at the shingled track centers $c_k$ from block 208 and the EM measurement is performed. However, instead of assuming that $c_k$ is the radial location where EM is maximum, the process can cause the reader to scan within a narrow radial range centered on $c_k$ in search for the true maximum value of EM. In this embodiment, the approximated shingled track centers or $c_k$ serve as the initial guess for the location of the EM bathtub centers. In one such case, the process can choose a starting point some distance away from the approximated midpoint $c_k$ and calculate a slope at the starting point to determine which direction to scan in order to move the scan toward the maxima.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 3:
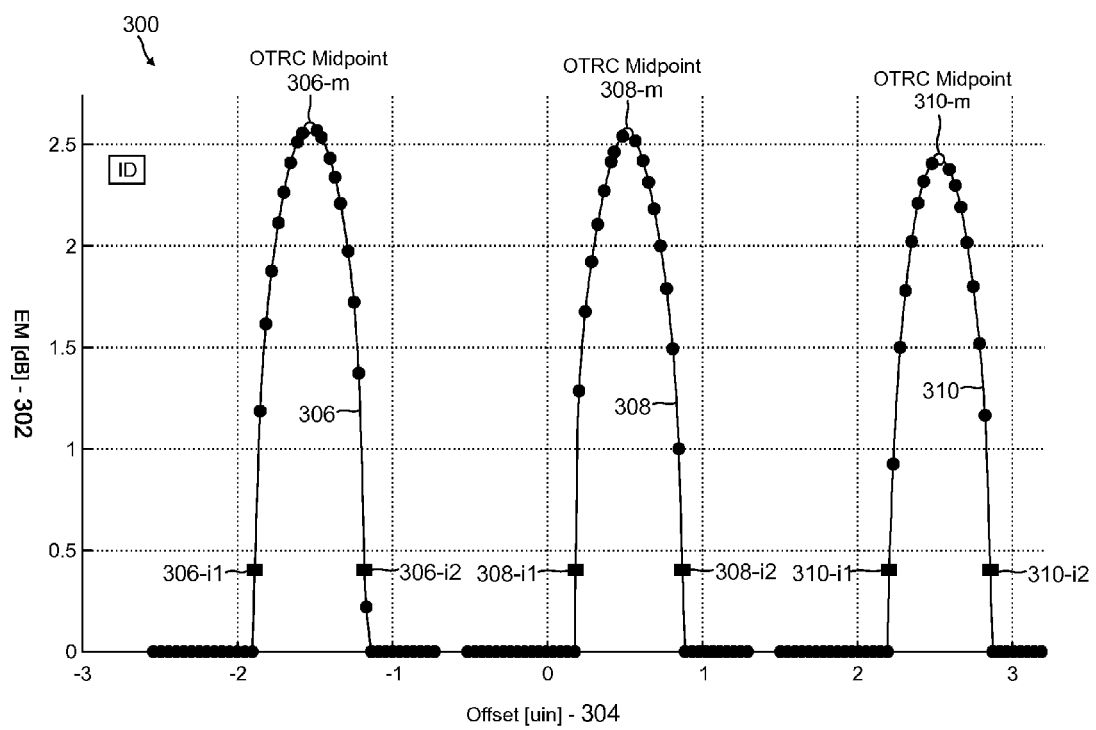
FIG. 3 is a graph of error margin (EM) versus radial offset showing EM measurements for three shingled tracks and the respective OTRC intercepts and midpoints where the tracks are measured near an inner diameter (ID) area of a test disk in accordance with one embodiment of the invention.

FIG. 3 is a graph 300 of error margin (EM) 302 versus radial offset 304 showing EM measurements for three shingled tracks (306, 308, 310) and the respective OTRC intercepts (306-*i*1, 306-*i*2, 308-*i*1, 308-*i*2, 310-*i*1, 310-*i*2) and midpoints (306-*m*, 308-*m*, 310-*m*) where the tracks are measured near an inner diameter (ID) area of a test disk in accordance with one embodiment of the invention. The EM 302 is measured in decibels or dB, and the radial offset is measured in micro inches or uin. Graph 300 can also be referred to as an example of the EM bathtubs of the three SMR tracks (306, 308, 310) at the ID. The OTRC or OTRC intercept (306-*i*1, 306-*i*2, 308-*i*1, 308-*i*2, 310-*i*1, 310-*i*2) is set for a preselected EM level, namely about 0.4 dB. A simple version of the proposed algorithms, where the track centers are approximated as being at the OTRC midpoints (306-*m*, 308-*m*, 310-*m*), measures the EM values at the OTRC midpoints. The proposed algorithm benefits from the fact that the OTRC midpoints (306-*m*, 308-*m*, 310-*m*) are at, or are very close to, the maxima of each EM bathtub.

The EM bathtubs of FIG. 3 illustrate that, among other things, the simple version of the proposed algorithm (e.g., use of EM values at OTRC midpoints) provides relatively accurate SMR EM (see EM at points 306-*m*, 308-*m*, 310-*m*). Similar EM data acquired at middle diameter (MD) and outer diameter (OD) areas are illustrated in FIG. 4 and FIG. 5.

Figure 4:
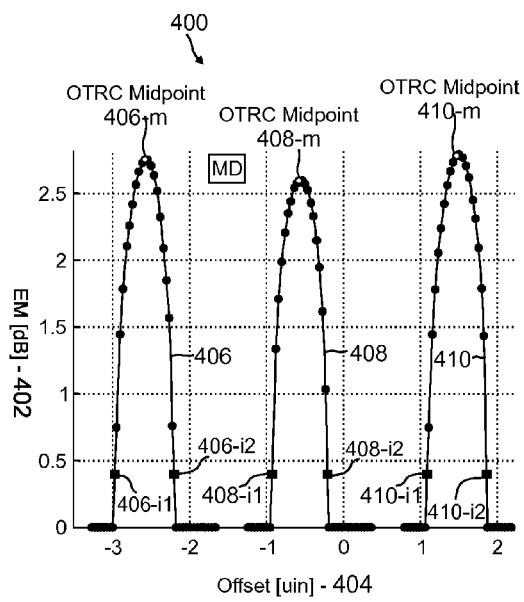
FIG. 4 is a graph of error margin (EM) versus radial offset showing EM measurements for the three shingled tracks of FIG. 3 and the respective OTRC intercepts and midpoints where the tracks are measured near a middle diameter (MD) area of the test disk in accordance with one embodiment of the invention.

FIG. 4 is a graph 400 of error margin (EM) 402 versus radial offset 404 showing EM measurements for the three shingled tracks (406, 408, 410) of FIG. 3 and the respective OTRC intercepts (406-*i*1, 406-*i*2, 408-*i*1, 408-*i*2, 410-*i*1, 410-*i*2) and midpoints (406-*m*, 408-*m*, 410-*m*) where the tracks are measured near a middle diameter (MD) area of a test disk in accordance with one embodiment of the invention.

Figure 5:
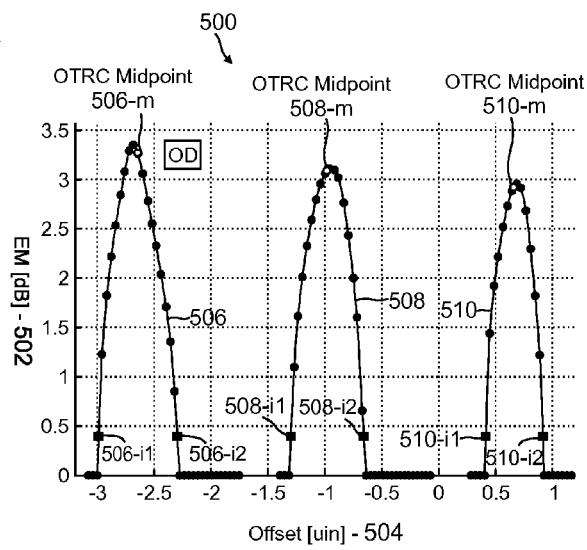
FIG. 5 is a graph of error margin (EM) versus radial offset showing EM measurements for the three shingled tracks of FIG. 3 and the respective OTRC intercepts and midpoints where the tracks are measured near an outer diameter (OD) area of the test disk in accordance with one embodiment of the invention.

FIG. 5 is a graph 500 of error margin (EM) 502 versus radial offset 504 showing EM measurements for the three shingled tracks (506, 508, 510) of FIG. 3 and the respective OTRC intercepts (506-*i*1, 506-*i*2, 508-*i*1, 508-*i*2, 510-*i*1, 510-*i*2) and midpoints (506-*m*, 508-*m*, 510-*m*) where the tracks are measured near an outer diameter (OD) area of a test disk in accordance with one embodiment of the invention.

In some aspects, the assessment of the SMR performance on commercial spin stand testers can be quite important for the development of heads and media. For example, based on EM and OTRC measurements at various kfci and ktpi conditions, the firmware for a hard disk drive (HDD) can choose the operating kfci and ktpi for each head/disk and radius in order to achieve optimal performance. The algorithms/processes proposed here can greatly reduce the measurement time for EM and OTRC without sacrificing accuracy and can be implemented in the HDD firmware.

As described in greater detail above, instead of measuring EM bathtubs (which is a relatively time consuming process), the proposed algorithms/processes can run EM measurements only at the centers of the shingled tracks (as calculated from OTRC bathtubs). Typical measurements on a commercial spin stand at ID, MD and OD areas using the proposed algorithms/processes demonstrate that the testing time can be substantially reduced. More specifically, in one example test at the ID, the test time can be reduced from 714 seconds to 55 seconds. At the MD, the test time can be reduced from 600 seconds to 55 seconds. At the OD, the test time can be reduced from 500 seconds to 45 seconds. In each such case, the test time was reduced by a factor of 10 or more.

In the experiments providing this data, seven SMR tracks have been written and the central three tracks have been characterized. Both the OTRC and the EM bathtubs were measured with a step size of about 0.04 microinches in the radial direction for a fair comparison between the traditional and proposed algorithms. The small step size can ensure that the measurement does not miss the maxima of the EM bathtubs. The test time for the traditional algorithm can be reduced by using a bigger step size, but such a choice can degrade the measurement quality.

The previous sections, and more specifically the previous sections describing FIGS. 3, 4 and 5, show that the accuracy of the measurement is not compromised by determining the SMR track centers by means of OTRC bathtubs. The next sections contain additional data at various testing conditions (kfci and ktpi) that further confirm the accuracy of the proposed techniques.

Figure 6:
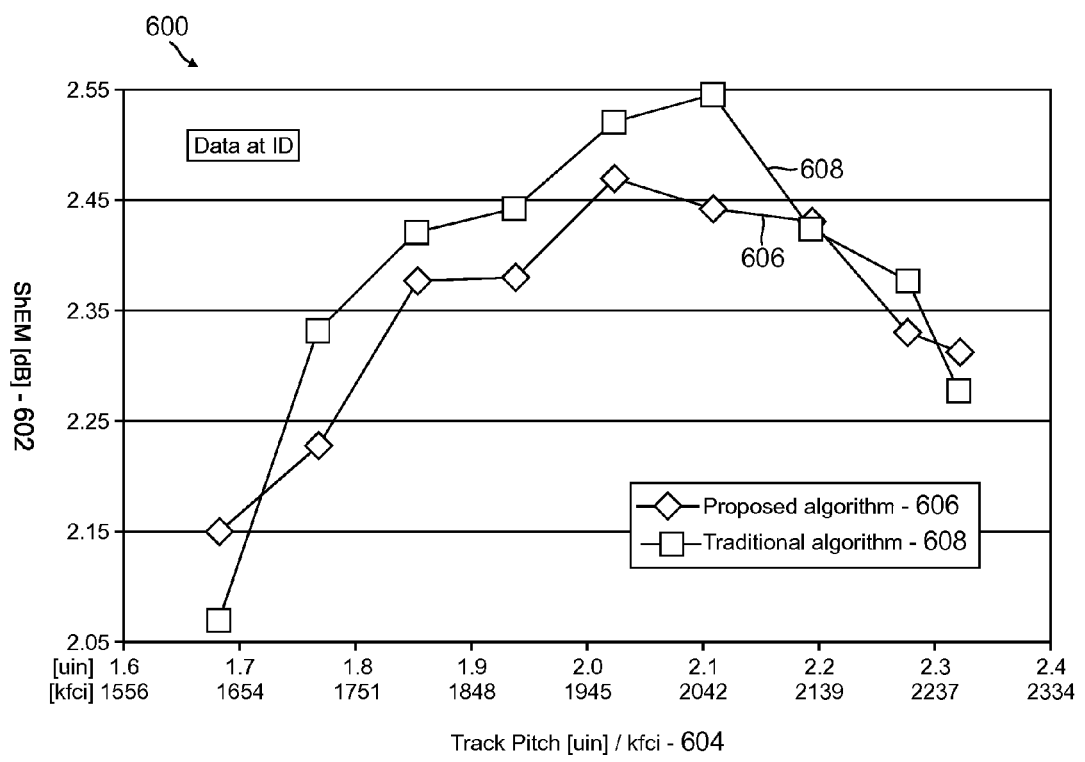
FIG. 6 is a graph of shingled error margin (ShEM) versus track pitch/kfci showing data for both a fast EM measurement process and a comparative full scan measurement, where the measurement data was taken at an inner diameter (ID) area of a test disk in accordance with one embodiment of the invention.

FIG. 6 is a graph 600 of shingled error margin (ShEM) 602 versus track pitch/kfci 604 showing data for both a fast EM measurement process 606 and a comparative full scan measurement 608, where the measurement data was taken at an inner diameter (ID) area of a test disk in accordance with one embodiment of the invention. The SMR EM data acquired at the ID is represented as a function of both kfci and track pitch (at fixed areal density) 604 and it exposes the three regimes described below. For kfci between 1900 and 2100 and corresponding track pitch between 1.95 and 2.15 microinches, the detrimental effects of high kfci and that of high ktpi are somewhat balanced and SMR performance is optimal (e.g., the SMR performance is about maximum within this range). It should be noted that ktpi is easily calculated from track pitch as is known in the art.

The data in FIG. 6 shows that the proposed method, in its simplest form (represented by curve 606 marked by diamonds), may underestimate EM when compared to the traditional algorithm (represented by curve 608 marked by squares) by a small amount (about 0.05 to 0.1 dB) which is similar to the typical variations encountered in SMR EM measurements. The test time is reduced from about 700 seconds to about 50 seconds, thus allowing more experiments (about 14 times more) to be carried out and thus resulting in more statistics.

To evaluate the robustness of the algorithm and the savings in test time, a series of experiments have been performed on a commercial spin stand tester. In these measurements, 7 shingled tracks have been written and the SMR performance of the central 3 tracks has been evaluated by using the traditional approach and the new algorithm. At each radius (ID, MD and OD), the experiment examines the SMR performance at a given areal density and various kfci and ktpi combinations that maintain that areal density (variable bit-aspect-ratio). In order to obtain the best savings in test time, the simplest form of the algorithm has been tested, where the SMR track centers have been approximated by using the midpoints of the OTRC bathtubs.

Some snapshots of the EM bathtubs have been shown in FIGS. 3, 4, and 5 for some particular kfci/ktpi combinations at ID, MD and OD. While not bound by any particular theory or observation, the kfci/ktpi combinations employed in the experiments shown in FIG. 6 explore three regimes with a couple of observations:

(1) At high kfci and low ktpi: SMR EM and OTRC are mainly driven by kfci and the effect of writing the neighboring tracks is small; the SMR tracks are quasi-isolated. The EM degradation due to increased kfci is the main driver behind the observed trend.

(2) At high ktpi and low kfci: SMR EM and OTRC are mainly driven by ktpi and the shingling process is responsible for the loss of performance.

(3) At moderate kfci and ktpi: SMR EM and OTRC reach optimal values.

In general, the assessment of the SMR performance on spin stand testers is a challenging task as it typically relies critically on the tester's ability to precisely position the writer and the reader to the desired locations. Because the SMR tracks are so closely "packed" in the radial direction (high ktpi requirements), any small error in radial positioning (track pitch) can result in significant measurement variations in the SMR EM and OTRC. As contrasted with SMR, perpendicular magnetic recording (PMR) EM measurements of either isolated tracks or tracks with side writes are less prone to measurement variation due to the more relaxed ktpi requirements.

In several embodiments, the proposed algorithms/methods presented include the benefits of improved test time and accuracy that is comparable to conventional methods. In one embodiment, an intrinsic advantage of one of the methods is that it estimates the centers of the shingled tracks whose EM is reported, and thus does not require writing new tracks with different patterns or band erasure, and uses no empirical observations.

While not bound by any particular theory, several alternative techniques/recipes can be imagined for determining the centers of the SMR tracks. For example, an alternative process could write the SMR tracks at a certain multiple of the system clock frequency (N×T) and measure the shift of the SMR tracks by means of amplitude track profiles through the overwrite filter. However, such recipes involve writing N×T SMR tracks and finding the shifted track centers, followed by band erasure and writing the SMR tracks with pseudo-random binary sequences (PRBS) sequences for the final EM/OTRC measurements. Multiple write and band erasure operations could introduce thermal drift, and radial positioning errors during the SMR writing (N×T and PRBS tracks), which could add up and result in significant measurement errors of the final SMR EM. Another potential disadvantage involves the observation that there is no known universal correlation between the radial shift experienced by SMR PRBS tracks and that experienced by SMR NxT tracks; empirical observations are typically tied to a particular media and head design, PRBS sequence and type of LDPC channel. As such, changes in media properties and/or head design from one development stage to another, a different PRBS sequence or different LDPC channel may compromise the previously-known empirical correlation between the radial shift of NxT and that of PRBS shingled tracks, thus affecting the validity of the SMR EM and OTRC measurements.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A system for performing fast measurement of a channel performance metric and off-track recording capability in shingled magnetic recording, the system comprising:
    a test platform configured to receive, support, and rotate a disk configured for magnetic information storage;
    a magnetic transducer configured to write to, and read from, the disk;
    a memory;
    a processor coupled to the memory, the magnetic transducer, and the test platform, the processor configured to:
        write a plurality of shingled tracks on the disk;
        measure an off track read capability (OTRC) of each of the plurality of shingled tracks;
        determine radial endpoints of the measured OTRC for each of the plurality of shingled tracks;
        determine an approximate radial center for each of the plurality of shingled tracks based on the respective OTRC radial endpoints; and
        measure a channel performance metric at a range centered around each of the approximate radial center for each of the plurality of shingled tracks.

2. The system of claim 1, wherein the range consists of a single point such that the processor is configured to measure the channel performance metric at the approximate radial center for each of the plurality of shingled tracks.

3. The system of claim 1, wherein the radial endpoints of the OTRC each represent a point at which a measurement of the channel performance metric exceeds a preselected level.

4. The system of claim 3:
    wherein the channel performance metric is an error margin; and
    wherein the preselected level is a preselected noise boost level and is about 0.4 decibels.

5. The system of claim 1, wherein the processor is further configured to determine a maximum value of the measured channel performance metric within the range for each of the plurality of shingled tracks.

6. The system of claim 1, wherein the processor is further configured to determine the approximate radial centers for each of the plurality of shingled tracks based on the respective OTRC radial endpoints by determining a radial midpoint between the radial endpoints for each of the plurality of shingled tracks.

7. The system of claim 1, wherein the measurements of the channel performance metric are used to modify a process for manufacturing a component for shingled magnetic recording, wherein the component is selected from the group consisting of a disk and a head.

8. The system of claim 1, wherein the measurements of the channel performance metric are used to modify a process for operating a hard disk drive configured for shingled magnetic recording.

9. The system of claim 1, wherein the processor is further configured to calculate a representative value of the channel performance metric for all of the plurality of shingled tracks, wherein the representative value is selected from the group consisting of a mean, a median, and a standard deviation.

10. The system of claim 1, wherein the channel performance metric comprises a metric selected from the group consisting of an error margin, an error rate, a Viterbi metric margin, a channel quality metric, and combinations thereof.

11. A method for performing fast measurement of a channel performance metric and off-track recording capability in shingled magnetic recording, the method comprising:
    writing a plurality of shingled tracks on the disk;
    measuring an off track read capability (OTRC) of each of the plurality of shingled tracks;
    determining radial endpoints of the measured OTRC for each of the plurality of shingled tracks;
    determining an approximate radial center for each of the plurality of shingled tracks based on the respective OTRC radial endpoints; and
    measuring a channel performance metric at a range centered around the approximate radial center for each of the plurality of shingled tracks.

12. The method of claim 11, wherein the range consists of a single point such that the measuring the channel performance metric at the range centered around the approximate radial center for each of the plurality of shingled tracks comprises measuring the channel performance metric at the approximate radial center for each of the plurality of shingled tracks.

13. The method of claim 11, wherein the radial endpoints of the OTRC each represent a point at which a measurement of the channel performance metric exceeds a preselected level.

14. The method of claim 13,
    wherein the channel performance metric is an error margin; and
    wherein the preselected level is a preselected noise boost level and is about 0.4 decibels.

15. The method of claim 11, further comprising determining a maximum value of the measured channel performance metric within the range for each of the plurality of shingled tracks.

16. The method of claim 11, wherein the determining the approximate radial center for each of the plurality of shingled tracks based on the respective OTRC radial endpoints comprises determining a radial midpoint between the radial endpoints for each of the plurality of shingled tracks.

17. The method of claim 11, further comprising using the measurements of the channel performance metric to modify a process for manufacturing disks for shingled magnetic recording.

18. The method of claim 11, further comprising using the measurements of the channel performance metric to modify a process for operating a hard disk drive configured for shingled magnetic recording.

19. The method of claim 11, further comprising calculating a representative value of the channel performance metric for all of the plurality of shingled tracks, wherein the representative value is selected from the group consisting of a mean, a median, and a standard deviation.

20. The method of claim 11, wherein the channel performance metric comprises a metric selected from the group consisting of an error margin, an error rate, a Viterbi metric margin, a channel quality metric, and combinations thereof.

\* \* \* \* \*